(12) United States Patent
Kondou

(10) Patent No.: US 6,638,453 B2
(45) Date of Patent: Oct. 28, 2003

(54) DIE HOLDER EXCHANGING METHOD AND APPARATUS

(75) Inventor: Daisaku Kondou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 129 days.

(21) Appl. No.: 10/024,547

(22) Filed: Dec. 21, 2001

(65) Prior Publication Data

US 2002/0096807 A1 Jul. 25, 2002

(30) Foreign Application Priority Data

Dec. 26, 2000 (JP) ......................................... 2000-395081

(51) Int. Cl.[7] ............................................... B29C 47/08
(52) U.S. Cl. ........................ 264/39; 425/186; 425/188; 425/190; 425/192 R
(58) Field of Search ................................ 264/39, 176.1; 425/186, 188, 190, 192 R, 376.1, 461

(56) References Cited

U.S. PATENT DOCUMENTS

| | | | | |
|---|---|---|---|---|
| 4,124,346 A | * | 11/1978 | Greenwood et al. | ........ 425/188 |
| 4,358,261 A | * | 11/1982 | Ohki | ........................ 425/131.1 |
| 4,983,113 A | * | 1/1991 | Hirschkorn | .................. 425/183 |
| 5,186,957 A | * | 2/1993 | Magnollay et al. | ...... 425/192 R |

* cited by examiner

Primary Examiner—James P. Mackey
Assistant Examiner—Joseph Leyson
(74) Attorney, Agent, or Firm—Sughrue Mion, PLLC

(57) ABSTRACT

Method and apparatus for exchanging a die holder of an extruder, which is tightly pressed from the bottom against a lower surface of an extrusion head by a press member. The pressing force of the press member is reduced to form a gap between a used die holder and the extrusion head. The used die holder and a next die holder positioned collinearly with each other are moved simultaneously and longitudinally, while slidingly contacting both of these die holders with the press member, so as to eject the used die holder from the press member and to deliver the next die holder onto the press member. The next die holder is then tightly pressed from the bottom onto the lower surface of the extrusion head by the press member.

5 Claims, 4 Drawing Sheets

DIE HOLDER EXCHANGING METHOD AND APPARATUS

BACKGROUND OF THE INVENTION

1. Field of the Invention

The present invention relates to a method of, and an apparatus for exchanging a die holder mounted on an extrusion head of an extruder.

2. Description of Related Art

Conventionally, for exchanging a die holder that is tightly pressed against the lower surface of an extrusion head by a press member, the press member is separated from the extrusion head and the used die holder is then dropped down and thereby detached from the extrusion head. Subsequently, a next die holder is delivered to a predetermined position at the lower surface of the extrusion head, and brought into contact with the lower surface and tightly pressed by the press member from the bottom.

The above-mentioned conventional method suffers from time-consuming operations and, hence, unsatisfactory work efficiency and productivity. This is because the detaching operation of the used die holder and the attaching operation of the next die holder are conducted separately, besides that the positioning of the next die holder relative to the extrusion head is not an easy operation in that it must be conducted while supporting the considerably heavy die holder from the bottom.

SUMMARY OF THE INVENTION

It is therefore an object of the present invention to provide improved die-holder exchanging method and apparatus, capable of readily exchanging a die holder in a short time and with higher work efficiency.

According to one aspect of the present invention, there is provided a method for exchanging a die holder of an extruder, which is tightly pressed from the bottom against a lower surface of an extrusion head by a press member, said method comprising the steps of (i) reducing the pressing force of said press member to thereby form a gap between the used die holder and said extrusion head; (ii) simultaneously and longitudinally moving the used die holder and a next die holder positioned collinearly with each other while slidingly contacting both of these die holders with said press member, so as to eject the used die holder from said press member and to deliver the next die holder onto said press member; and (iii) tightly pressing the next die holder from the bottom onto the lower surface of said extrusion head by said press member.

According to another aspect of the present invention, there is provided an apparatus for exchanging a die holder of an extruder, which is tightly pressed from the bottom against a lower surface of an extrusion head by a press member, said apparatus comprising (i) gap forming means for reducing the pressing force of said press member to thereby form a gap between the used die holder and said extrusion head; and (ii) moving means for simultaneously and longitudinally moving the used die holder and a next die holder positioned collinearly with each other while slidingly contacting these die holders with said press member, so as to eject the used die holder from said press member and deliver the next die holder onto said press member.

In exchanging the die holder of an extruder, according to the present invention, the gap forming means is first of all operated to reduce the pressing force that is being applied onto the used die holder by the press member, to thereby form a gap between the extrusion head and the used die holder. Then, the used die holder and a next die holder positioned collinearly with each other are simultaneously and longitudinally moved by the moving means, so as to eject the used die holder from the press member and deliver the next die holder onto the press member. In this way, the die holders are exchanged. At this time, both of the used die holder and next die holder are simultaneously moved, thereby allowing the exchange of the die holder in a short time to thereby improve the work efficiency and productivity.

Furthermore, in exchanging the die holder, the used die holder and the next die holder are moved simultaneously while slidingly contacting with the press member, i.e., while they are guided by the press member. Thus, the die holders are prevented from being moved in the widthwise direction. As a result, simply by operating the press member so as to press the next die holder from the bottom onto the extrusion head, the next die holder can be precisely and readily aligned with a predetermined position of the extrusion head in a short time to thereby further improve the work efficiency.

It is preferred that the die holder exchanging apparatus according to the present invention further comprises an adjusting mechanism for adjusting the gap amount between said extrusion head and the used die holder. In this instance, it is possible to readily and simultaneously smoothen the movement of the used and next die holders into the longitudinal direction, and to reduce the amount of the extrusion material to be left between the die holder and extrusion head.

It is also preferred that each die holder is provided with a scraper at its front end portion as seen in the moving direction thereof, so that the scraper is slidingly contacted with the lower surface of said extrusion head when the die holder is longitudinally moved. In this instance, it is possible to significantly reduce the amount of the extrusion material to be left between the extrusion head and die holder.

It is also preferred that the die holder exchanging apparatus according to the present invention further comprises storing means for storing a plurality of die holders to be used afterward, and transfer means for taking out die holders one by one from said storing means in accordance with the using order, and for transferring the taken out die holder to a position collinear with the used die holder. In this instance, it is possible to transfer a next die holder to a position collinear with the used die holder by an outside preparation during the extruding operation, so as to cause the next die holder to wait for the exchanging time, and thereby facilitate a rapid exchange of the die holders.

DETAILED DESCRIPTION OF PREFERRED EMBODIMENT

The present invention will be described in further detail hereinafter, with reference to a preferred embodiment shown in the accompanying drawing.

Figure 1:
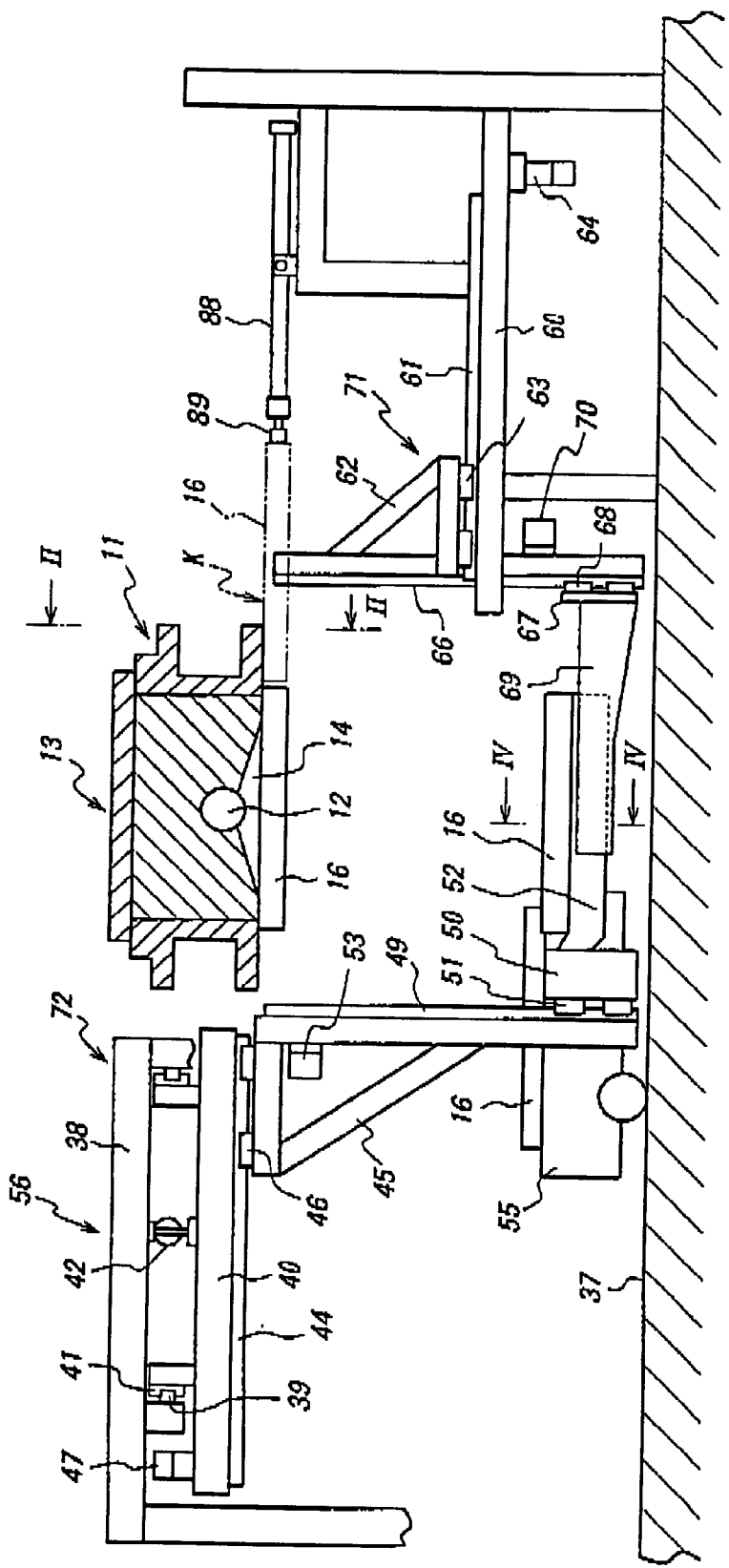
FIG. 1 is a partly broken front view of the die holder exchanging apparatus according to an embodiment of the present invention.
Figure 2:
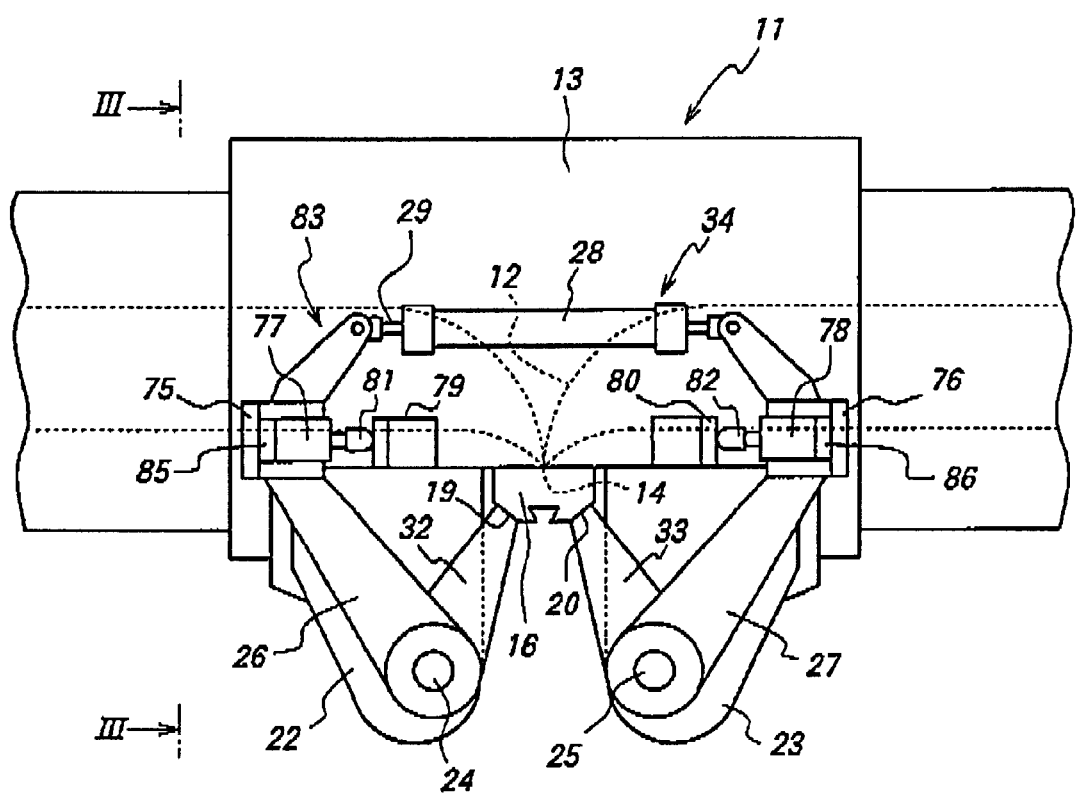
FIG. 2 is a view as seen in the direction of arrow II—II in FIG. 1.
Figure 3:
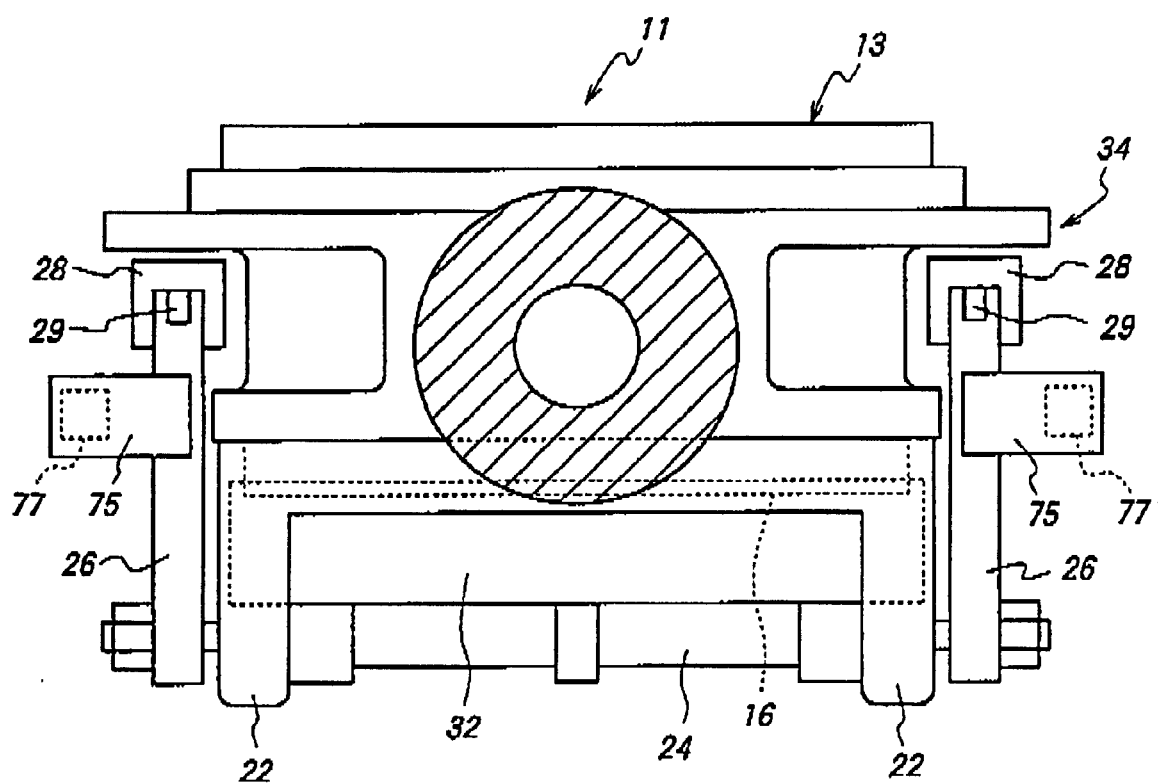
FIG. 3 is a sectional view along the line III—III in FIG. 1.

Referring to FIGS. 1, 2 and 3, reference numeral 11 designates an extruder for extruding an extrusion material, here unvulcanized rubber, to thereby form a belt-like material which mat be for a tread rubber member, for instance. The extruder 11 includes an extrusion head 13 formed therein with a pair of passages 12 to be supplied with different kinds of extrusion materials from opposite sides, respectively. The extrusion materials supplied into the passages 12 are discharged downwards, via a discharge port 14 formed at the center of the lower surface of the extrusion head 13 so as to extend in the fore-and-aft direction.

Figure 4:
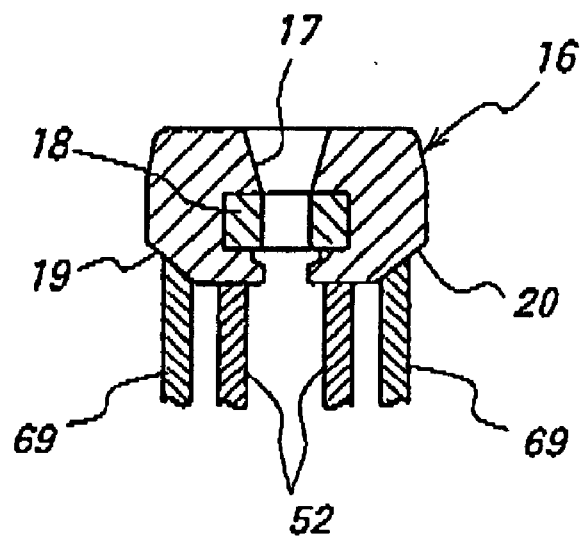
FIG. 4 is a sectional view along the line IV—IV in FIG. 1.

Reference numeral 16 designates a die holder attached to the extrusion head 13 by tightly pressing the die holder from the bottom onto the lower surface of the extrusion head 13. The die holder 16 exhibits a substantially square column shape extending in the fore-and-aft direction, so as to close the discharge port 14 from the bottom. As shown in FIG. 4, the die holder 16 is formed therein with an extruding passage 17 having an upper end communicated with the discharge port 14 and a lower end opened at the lower surface of the die holder 16. The extruding passage 17 is provided, midway therethrough, with a mouthpiece 18 for defining the cross-sectional shape of the belt-like member. The die holder 16 is further formed, at its lateral end portions, with inclined surfaces 19, 20, respectively, which are inclined upwardly toward the lateral ends.

The extrusion head 13 is integrally provided, on its lower surface at the front and back ends, with two pairs of bracket portions 22, 22 and 23, 23. The paired bracket portions 22, 22 and 23, 23 are inserted by front and rear ends of rotary shafts 24, 25 that extend in the fore-and-aft direction in a rotatably supported manner, respectively. Fixed to the frond and rear ends of the rotary shafts 24, 25 are lower ends of swing arms 26, 26, 27, 27, respectively. Each of the swing arms 26, 26, 27, 27 extends substantially upwardly in a manner bent from the associated rotary shaft.

Arranged between the upper ends of the front and rear swing arms 26, 26, 27, 27 are cylinders 28, 28, respectively, extending in the right-and-left direction. The cylinders 28, 28 have head portions that are coupled to the swing arms 27, 27, and piston rods 29, 29 having tip ends coupled to the swing arms 26, 26; respectively. As a result, by operating the cylinders 28, 28 and thereby extending or retracting the piston rods 29, 29, the swing arms 26, 26, 27, 27 are caused to swing about the rotary shafts 24, 25, respectively.

The rotary shaft 24 between the bracket portions 22, 22 and the rotary shaft 25 between the bracket portions 23, 23 are fixedly connected with lower ends of press members 32, 33, respectively, having the substantially same lengths as the die holder 16. The press members 32, 33 extend toward the inclined surfaces 19, 20 of the die holder 16, respectively, such that the tip ends (upper ends) of the press members 32, 33 are brought into contact with the inclined surfaces 19, 20, respectively. When the piston rods 29, 29 of the cylinders 28, 28 are retracted, the swing arms 26, 26 and press member 32 as well as swing arms 27, 27 and press member 33 are caused to inwardly and integrally swing about the rotary shafts 24, 25, respectively. As a result, the tip ends of the press members 32, 33 lift the die holder 16 while slidingly contacting with the inclined surfaces 19, 20 of the die holder 16, respectively, to thereby tightly press the die holder 16 onto the lower surface of the extrusion head 13 from the bottom.

The rotary shafts 24, 25, swing arms 26, 26, 27, 27 and cylinders 28, 28 cooperatively constitute pressing means 34 for providing the press members 32, 33 with pressing forces for pressing the die holder 16 onto the lower surface of the extrusion head 13. When the extruding passage 17 is supplied with the extrusion materials via passages 12 while the die holder 16 is pressed onto the lower surface of the extrusion head 13, the extrusion materials are extruded downwardly, with its cross-sectional shape defined by the mouthpiece 18, thereby continuously forming the belt-like material such as tread rubber.

Installed on a floor surface 37 in front of the extruder 11 is a first fixing frame 38 having an upper end portion provided with a pair of guide tracks 39, 39 that extend horizontally in the right-and-left direction. Reference numeral 40 designates a moving table provided, at its upper surface, with slide bearings 41, 41 for slidably engaging with the guide tracks 39, 39. The moving table 40 is coupled with a tip end of a piston rod of a cylinder 42 extending in parallel with the guide tracks 39, 39 which, in turn, are mounted to the upper end portion of the first fixing frame 38. As a result, by operating the cylinder 42, the moving table 40 is caused to move toward right or left in the figure while being guided by the guide tracks 39, 39.

The moving table 40 has its lower surface provided with a pair of guide tracks 44, 44 that extend in the fore-and-aft direction. The guide tracks 44, 44 are slidably engaged with slide bearings 46, 46 fixedly arranged on the upper end of a moveable stand 45. The moveable stand 45 is moved in the fore-and-aft direction while being guided by the guide tracks 44, 44, by the operation of a motor 47 mounted on the moving table 40.

Reference numerals 49, 49 designate a pair of guide tracks mounted on the rear surface of the moveable stand 45 so as to extend in the vertical direction. The guide tracks 49, 49 are slidably engaged with slide bearings 53, 53 that are fixedly arranged at a front end of an elevating stand 50. Fixed at the rear end of the elevating stand 50 is a pair of supporting bars 52, 52 that extend rearwards. The supporting bars 52, 52 are capable of supporting the die holder 16 from the bottom. The elevating stand 50 is raised and lowered while being guided by the guide tracks 49, 49, by operating a motor 53 mounted on the moveable stand 45.

Reference numeral 55 designates a carriage as storing means moveable on the floor surface 37, on which a plurality of die holders 16 to be used thereafter and a plurality of used die holders 16 are placed and stored. The above-mentioned first fixing frame 38, guide tracks 39, 39, moving table 40, slide bearings 41, 41, cylinder 42, guide tracks 44, 44, moveable stand 45, slide bearings 46, 46, motor 47, guide tracks 49, 49, elevating stand 50, slide bearings 51, 51, supporting bars 52, 52 and motor 53 cooperatively constitute first transfer means 56, for taking out die holders 16 to be used afterward one by one from the carriage 55 in accordance with the using order so as to pass the applicable die holder 16 to second transfer means to be described later, and for receiving the used die holder 16 that has been ejected from the extrusion head 13 so as to deliver and place the used die holder 16 onto the carriage 55.

Reference numeral 60 designates a second fixing frame installed on the floor surface 37 on the rear side of the extrusion head 13. The second fixing frame 60 is provided, at the central portion thereof in the height direction, with a pair of guide tracks 61, 61 extending in the fore-and-aft direction. Reference numeral 62 designates a moveable frame having a lower end that is provided with slide bearings 63 for slidably engaging with the guide tracks 61, 61. The moveable frame 62 can be moved in the fore-and-aft direction while being guided by the guide track 61, by operating a motor 64 mounted on the second fixing frame 60.

The front end of the moveable frame 62 is provided with a pair of vertically extending guide tracks 66, 66 that are slidably engaged with slide bearings 68 mounted to a elevating frame 67. The elevating frame 67 is fixedly connected with a pair of horizontal supporting bars 69, 69 that extend forwards. The supporting bars 69, 69 are capable of supporting thereon the die holder 16 from the bottom. The elevating frame 67 can be raised and lowered while being guided by the guide tracks 66, 66, by operating a motor 70 mounted on the moveable frame 62.

In the manner shown in FIG. 1, the front portions of the supporting bars 69, 69 and the rear portions of the supporting bars 52, 52 are allowed to overlap with each other, when the moveable frame 62 has been moved up to its most advanced position and the moveable stand 45 has been moved up to its rearmost position. Here, the spacing between the supporting bars 69, 69 is wider than that between the supporting bars 52, 52, so that the supporting bars 52, 52 are allowed to pass between the supporting bars 69, 69 without interfering with the supporting bars 69, 69. At this time, when a die holder 16 has been placed on the supporting bars 52, 52, the die holder 16 is transferred from the supporting bars 52, 52 onto the supporting bars 69, 69 by passing the supporting bars 52, 52 downwards through and between the supporting bars 69, 69.

Upon transferring the die holder 16 onto the supporting bars 69, 69 in this way, the moveable frame 62 is moved rearwards and the elevating frame 67 together with the supporting bars 69, 69 and die holder 16 are raised. By this, the supported die holder 16 is transferred up to a stand-by position K collinear with and just rearward of the current-use die holder 16. The above-mentioned second fixing frame 60, guide tracks 61, 61, moveable frame 62, slide bearings 63, motor 64, guide tracks 66, 66, elevating frame 67, slide bearings 68, supporting bars 69, 69 and motor 70 cooperatively constitute second transfer means 71 for moving the die holder 16 that has been transferred from the first transfer means 56 toward the position collinear with the current-use die holder 16.

Further, the above-mentioned first transfer means 56 and second transfer means 71 cooperatively constitute transfer means 72 for taking out die holders 16 one by one in accordance with the using order from the carriage 55 acting as the storing means so as to transfer the taken out die holder 16 toward a position collinear with the current-use die holder 16. Provision of such transfer means 72 allows to transfer a next die holder 16 to a position collinear with the current-use die holder 16 by an outside preparation daring the extruding operation, so as to cause the next die holder 16 to wait for the exchanging time, thereby facilitating the rapid exchange of die holders 16.

Reference numerals 75, 75, 76, 76 designate brackets fixedly connected to the bent portions of the swing arms 26, 26, 27, 27, respectively. The brackets 75, 75, 76, 76 are detachably provided with head portions of cylinders 77, 77, 78, 78, respectively, such that these cylinders 77, 77, 78, 78 extend inwardly, i.e., toward the center in the right-and-left direction. Reference numerals 79, 79, 80, 80 designate stoppers fixedly connected to the front and rear surfaces of the extrusion head 13 inwards of the cylinders 77, 77, 78, 78, respectively. The stoppers 79, 79, 80, 80 are abutted with the tip ends of piston rods 81, 81, 82, 82 of the cylinders 77, 77, 78, 78 when the piston rods 81, 81, 82, 82 are protruded, respectively.

It is assumed that the urging forces of the cylinders 77, 77, 78, 78 are made larger than the retracting forces of the cylinders 28, 28. Thus, when the piston rods 81, 81, 82, 82 are brought into abutment with the stoppers 79, 79, 80, 80, respectively, before the piston rods 81, 81, 82, 82 reach the protrusion limits, respectively, the piston rods 81, 81, 82, 82 are continuously protruded up to their protrusion limits to thereby outwardly swing the swing arms 26, 26 and press member 32, as well as swing arms 27, 27 and press member 33, against the retracting forces of the cylinders 28, 28.

As a result, the press members 32, 33 are pushed back so that the pressing forces by the press members 32, 33 onto the die holder 16 are reduced. On this occasion, the die holder 16 is slightly dropped (parallel downward movement) by its own weight and the inner pressure from the extrusion material, to thereby form a slight gap between the upper surface of the die holder 16 and the lower surface of the extrusion head 13.

The above-mentioned brackets 75, 75, 76, 76, cylinders 77, 77, 78, 78 and stoppers 79, 79, 80, 80 cooperatively constitute gap forming means 83 for forming a gap between the extrusion head 13 and die holder 16 by reducing the pressing forces by the press members 32, 33. Reference numerals 85, 85, 86, 86 designate spacers as adjusting mechanisms exchangeably interposed between the brackets 75, 75, 76, 76 and cylinders 77, 77, 78, 78, respectively. By exchanging these spacers 85, 85, 86, 86 with those having different thickness, it is possible to adjust the gap amount between the extrusion head 13 and die holder 16.

Reference numeral 88 designates a cylinder as moving means that is coupled to an upper portion of the second fixing frame 60. The cylinder 88 extends, at a position rearward of the stand-by position K, collinearly with the die holder 16 in the stand-by position K. As a result, when the cylinder 88 is operated to thereby protrude a piston rod 89, both of the used die holder 16 and a next die holder 16 positioned in a collinear manner are pushed by the piston rod 89 and moved in the longitudinal direction, i.e., in the forward direction in the illustrated embodiment, to thereby eject the used die holder 16 from the press members 32, 33 and deliver the next die holder 16 onto the press members 32, 33. At this time, the used and next die holders 16 are moved while slidingly contacting with the upper surfaces of the press members 32, 33.

When the die holders 16 are exchanged so as to be laterally slid while forming the flap between the die holders 16 and extrusion head 13 in the manner explained above, the extrusion material laterally cut between the extrusion head 13 and die holders 16 tends to be slightly dragged into the moving direction of the die holders 16 such that the extrusion material adheres onto the lower surface of the extrusion head 13. If the next die holder 16 is tightly pressed onto the extrusion head 13 from the bottom in the above-mentioned state where the extrusion material is adhered onto the lower surface of the extrusion head 13, there tends to be formed a slight gap between the die holder 16 and extrusion head 13, resulting in that the extrusion material upon extruding is leaked out from the gap, or resulting in that different kinds of rubbers are mutually mixed to thereby deteriorate the quality of the belt-like material.

Figure 5:
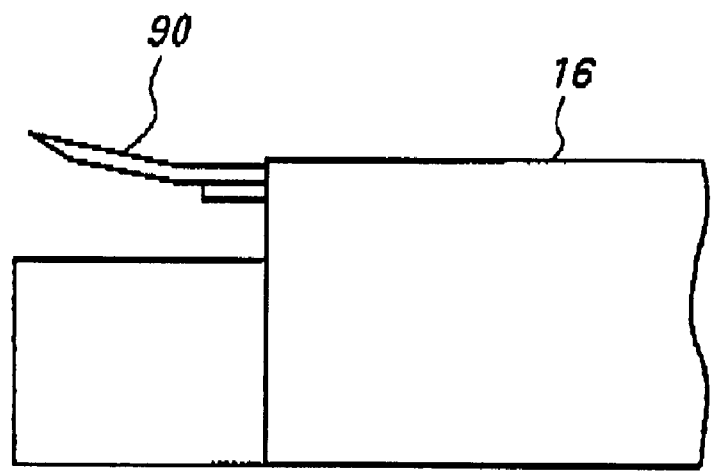
FIG. 5 is a view showing the front end portion of a die holder.

Therefore, as shown in FIG. 5, the apparatus according to the illustrated embodiment is further provided with a scraper 90 comprised of a spring steel, at a front end portion of each die holder 16 in the moving direction. The scraper 90 has substantially the same width as the die holder 16 and includes a tip end projecting slightly upwards beyond the upper surface of the die holder 16. As a result, the leading edge of the scraper 90 is slidingly contacted with the lower surface of the extrusion head 13, particularly with the extrusion head 13 around the discharge port 14, as the die holder 16 is pushed by the cylinder 88 and moved forwardly Thus, the extrusion material that may be adhered to the lower surface of the extrusion head 13 can be scraped away therefrom, at each exchanging operation of die holders 16.

There will be described hereinafter an operation of the embodiment of the present invention.

It is assumed that the extrusion material supplied to the current-use die holder 16 via passage 12 of the extrusion head 13 is extruded downwardly via the mouthpiece 18, with the cross-sectional shape of the extrusion material being defined by the mouthpiece 18, to form a continuous belt-like material such as a tread rubber material. At this time, the moving table 40 of the first transfer means 56, the moveable stand 45 and the elevating stand 50 have been moved to their rightmost position, most advanced position and uppermost position, respectively, and the supporting bars 52, 52 carry thereon the next die holder 16 that has been received from the carriage 55. Meanwhile, the moveable frame 62 of the second transfer means 71 and the elevating frame 67 have been moved to their rearmost position and lowermost position and stopped there, respectively, while the supporting bars 69, 69 carry nothing thereon, When the use of the current die holder 16 has been terminated and the used die holder 16 is to be exchanged for a next die holder 16, the motor 53 is operated to thereby integrally lower the elevating stand 50, supporting bars 52, 52 and next die holder 16 along the guide tracks 49, 49, down to a midway position. At this time, the motor 64 is operated to move the moveable frame 62 up to its most advanced position along the guide tracks 61, 61. The motor 47 is then operated to move the moveable stand 45, elevating stand 50, supporting bars 52, 52 and next die holder 16 to their rearmost positions along the guide tracks 44, 44, respectively, to thereby place the rear portions of the supporting bars 52, 52, just above the front portions of the supporting bars 69, 69.

The motor 53 is then operated again to lower the elevating stand 50, supporting bars 52, 52 and next die holder 16 to their lowermost positions. At this time, the spacing between the supporting bars 69, 69 is wider than that between the supporting bars 52, 52, so that the supporting bars 52, 52 are allowed to pass between the supporting bars 69, 69 without interfering with the supporting bars 69, 69. During the passing, the next die holder 16 placed on the supporting bars 52, 52 is transferred from the supporting bars 52, 52 onto the supporting bars 69, 69, and then supported by the supporting bars 69, 69 from the bottom.

The motor 47 and the motor 53 are then operated to move the moveable stand 45 to its most advanced position and the elevating stand 50 and emptied supporting bars 52, 52 to their uppermost positions. At this position, the supporting bars 52, 52 are capable of supporting the used die holder 16 from the bottom, which is to be ejected from the extrusion head 13. Meanwhile, in the second transfer means 71, the motor 64 and the motor 70 are operated: to move the moveable frame 62 to its rearmost position; and to move the elevating frame 67 and the supporting bars 69, 69 supporting thereon the next die holder 16 from the bottom, to their uppermost positions, respectively. As a result, the next die holder 16 is moved to the stand-by position K collinear with and just rearward of the currently used die holder 16.

Thereafter, when the supply of the extrusion material is stopped to thereby finish the forming of the belt-like material, the current die holder 16 is turned into or regarded as a used die holder 16. The cylinders 77, 77, 78, 78 of the gap forming means 83 are then operated to protrude the piston rods 81, 81, 82, 82, respectively. At this time, the tip ends of the piston rods 81, 81, 82, 82 are brought into abutment with the stoppers 79, 79, 80, 80 before the piston rods 81, 81, 82, 82 reach their protrusion limits. However, the piston rods 81, 81, 82, 82 are continuously protruded to their protrusion limits, even after the above-mentioned abutment. Thus, the swing arms 26, 26 and press member 32 as well as swing arms 27, 27 and press member 33 are caused to swing outwardly, irrespectively of the retracting forces of the cylinders 28, 28.

As a result, the press members 32, 33 are pushed back so that the pressing forces applied by the press members 32, 33 onto the used die holder 16 are reduced. By this, the die holder 16 is slightly dropped by its own weight and by the inner pressure from the extrusion material, to thereby form a slight gap between the upper surface of the die holder 16 and the lower surface of the extrusion head 13. On this occasion, the die holder 16 is supported by the press members 32, 33 from the bottom.

When the cylinder 88 is subsequently operated to protrude the piston rod 89, the next die holder 16 supported from the bottom by the supporting bars 69, 69 is firstly pushed by the piston rod 89, and the next die holder 16 pushes the used die holder 16 supported from the bottom by the press members 32, 33. By this, the used die holder 16 and next die holder 16 positioned collinearly with each other are moved simultaneously and forwardly, so that the used die holder 16 is ejected and transferred from the press members 32, 33 onto the supporting bars 52, 52 of the first transfer means 56, while the next die holder 16 is delivered onto the press members 32, 33 from the supporting bars 69, 69.

At this time, the used die holder 17 and the next die holders 16 are moved while slidingly contacting with the press members 32, 33. In this ways upon exchange of the die holders 16 with the method according to the present invention, both of the used die holder 16 and next die holder 16 are simultaneously moved, making it possible to conduct the exchange operations in a short time and with improved work efficiency and productivity.

In the above, excessively small amounts of the above-mentioned gap tend to increase the frictional resistance between the next die holder 16 and the extrusion head 13 as well as the press members 32, 33 to thereby obstruct the movement of the die holder 16 into the longitudinal direction. On the other hand, excessively large amounts of the gap tend to cause a large amount of extrusion material to be leaked out from between the die holder 16 and the extrusion head 13.

Thus, in the illustrated embodiment, the spacers 85, 85, 86, 86 are to be duly exchanged for ones having an appropriate thickness so as to set the above-mentioned gap amount at a proper value within a range of 0.01 mm to 0.50 mm. By this, it is possible to readily smoothen the movement of the used and next die holders 16 into the longitudinal direction, and at the same time to reduce the amount of the extrusion material to be left between the die holder 16 and extrusion head 13.

However, even when the gap amount is adjusted to the proper value in the aforementioned manner, the exchange of the die holder 16 by the lateral slide thereof may result in that the extrusion material is slightly dragged in the moving direction of the die holder 16 such that the extrusion material is adhered onto the lower surface of the extrusion head 13.

Therefore, the apparatus according to the illustrated embodiment is provided with the scraper 90 comprised of a spring steel, at the front end portion of each die holder 16 in the moving direction, such that the leading edge of the scraper 90 is slidingly contacted with the lower surface of the extrusion head 13, particularly with the extrusion head 13 around the discharge port 14, as the die holder 16 is moved in the longitudinal direction. This allows the extrusion material adhered onto the lower surface of the extrusion head 13 to be scraped away from the lower surface by the scraper 90, at each exchanging operation of die holders 16. It is therefore possible to significantly reduce the amount of the extrusion material to be left between the extrusion head 13 and die holder 16.

When the piston rods 81, 81, 82, 82 of the cylinders 77, 77, 78, 78 are retracted, the swing arms 26, 26, 27, 27 and the press members 32, 33 are caused to swing inwards, by the retracting forces of the cylinders 28, 28, respectively. As a result, the next die holder 16 is applied with pressing forces by the press members 32, 33 and thereby pressed tightly onto the lower surface of the extrusion head 13 from the bottom. In the above, the next die holder 16 has been never moved in the widthwise direction, since this die holder 16 has been moved to just under the extrusion head 13 while being slidingly contacted with, and guided by the press members 32, 33.

Thus, by simply pressing the next die holder 16 onto the extrusion head 13 by means of the press members 32, 33 in the manner explained above, the next die holder 16 can be readily and precisely aligned with a predetermined position of the extrusion head 13 in a short time to thereby improve the work efficiency and productivity. The next die holder 16 mounted to the extrusion head 13 is now regarded as the current die holder 16 that is ready for use.

The cylinder 42 and motors 47, 53 of the first transfer means 56 are then operated to move the supporting bars 52, 52, which support the used die holder 16 from the bottom, toward the carriage 55. Thus, the used die holder 16 is transferred from the supporting bars 52, 52 onto the carriage 55, such that the supporting bars 52, 52 then receive a next die holder 16 from the carriage 55 and are thereafter returned to the initial stand-by position of the supporting bars 52, 52. At this time, the motors 64, 70 of the second transfer means 71 are also operated to return the emptied supporting bars 69, 69 to the initial stand-by position. Furthermore, the piston rod 89 of the cylinder 88 is retracted. Meanwhile, as form the extruder 11, the extrusion material is supplied into the current die holder 16 via passage 12, so that the belt-like material having the predetermined cross-sectional shape is extruded continuously.

In the above-mentioned embodiment, there have been used the cylinders 77, 77, 78, 78 as the gap forming means 83. However, it is also possible to use a screw mechanism, link mechanism, or the like. Further, in the above-mentioned embodiment, the scraper 90 is comprised of a spring steel such that the tip end of the scraper 90 is brought into abutment with the lower surface of the extrusion head 13 by virtue of the elastic restoring force of the spring steel itself. However, it is possible to rotatably support a proximal end of a scraper onto the die holder and to press the tip end of the scraper onto the lower surface of the extrusion head by a spring or cylinder.

It will be appreciated from the foregoing detailed description that, according to the present invention, it becomes possible to readily exchange a die holder in a short time and with improved work efficiency and productivity.

While the present invention has been described above with reference to a preferred embodiment shown in the drawings, it is needless to say that various changes and/or modifications may be made without departing from the scope of the invention as defined by the appended claims.

What is claimed is:

1. A method for exchanging a die holder of an extruder, which is tightly pressed from the bottom against a lower surface of an extrusion head by a press member, said method comprising, the steps of:

reducing the pressing force of said press member to form a gap between a used die holder and said extrusion head;

simultaneously and longitudinally molting the used die holder and a next die holder positioned collinearly with each other while slidingly contacting both of these die holders with said press member, so as to eject the used die holder from said press member and to deliver the next die holder onto said press member; and tightly pressing the next die holder from the bottom onto the lower surface of said extrusion head by said press member.

2. An apparatus for exchanging a die holder for an extruder, which is tightly pressed from the bottom against a lower surface of an extrusion head by a press member, said apparatus comprising:

gap forming means for reducing the pressing force of said press member to thereby form a gap between the used die holder and said extrusion head; and moving means for simultaneously and longitudinally moving the used die holder and a next die holder positioned collinearly with each other while slidingly contacting these die holders with said press member, so as to eject the used die holder from said press member and deliver the next die holder onto said press member.

3. The apparatus according to claim 2, further comprising an adjusting mechanism for adjusting the gap amount between said extrusion head and the used die holder.

4. The apparatus according to claim 2, wherein each die holder is provided with a scraper at a front end portion of the die holder in the moving direction thereof, so that the scraper is slidingly contacted with the lower surface of said extrusion head when the die holder is longitudinally moved.

5. The apparatus according to any one of claims 2 to 4, further comprising:

storing means for storing a plurality of die holders to be used afterward; and transfer means for taking out die holders one by one from said storing means in accordance with the using order, and for transferring the taken out die holder to a position collinear with the used die holder.

* * * * *